United States Patent [19]
Cross

[11] Patent Number: 5,365,727
[45] Date of Patent: Nov. 22, 1994

[54] GRASS-BAGGING APPARATUS

[76] Inventor: Donald R. Cross, 5907 Northwest Williams Ave., Lawton, Okla. 73505

[21] Appl. No.: 102,893

[22] Filed: Aug. 6, 1993

[51] Int. Cl.⁵ .................................... D01D 34/12
[52] U.S. Cl. .................................. 56/194; 56/202
[58] Field of Search .............. 56/12.2, 2.9, 16.6, 56/194, 195, 196, 197, 199, 202, 203, 204, 205, 206, 320.1, 320.2, 321

[56] References Cited

U.S. PATENT DOCUMENTS

| | | | |
|---|---|---|---|
| 3,133,396 | 5/1964 | Leader | 56/202 |
| 3,199,277 | 8/1965 | Moody | 56/25.4 |
| 3,492,800 | 2/1970 | Peterson et al. | 56/202 |
| 3,521,436 | 7/1970 | Venzke | 56/199 |
| 3,708,968 | 1/1973 | Enters et al. | 56/16.5 |
| 3,874,152 | 4/1975 | Dahl | 56/202 |
| 4,251,982 | 2/1981 | Skaja et al. | 56/202 |
| 4,345,418 | 8/1982 | Arizpe | 56/202 |
| 4,377,063 | 3/1983 | Leaphart | 56/202 |
| 4,505,095 | 3/1985 | Short, Sr. | 56/202 |
| 4,566,257 | 1/1986 | Akrabawi | 56/202 |
| 4,989,400 | 2/1991 | Wark | 56/202 |
| 5,042,241 | 8/1991 | Boylston et al. | 56/202 |

Primary Examiner—Ramon S. Britts
Assistant Examiner—Pamela Anne O'Connor
Attorney, Agent, or Firm—Dougherty, Hessin, Beavers & Gilbert

[57] ABSTRACT

A grass-bagging apparatus for use with a lawn mower. The apparatus includes a chute with a disposable bag disposed therearound. An attaching frame is used to fasten the chute to the mower and retain the bag thereon. Grass and other cuttings discharged from the lawn mower are directed in the bag through the chute. After the bag is filled, the chute may be removed from the bag while leaving the cuttings in the bag. The filled bag may then be closed for disposal and a new bag positioned on the chute. A protective screen may be provided between the plastic bag and the operator in the event that objects discharged from the mower penetrate the material of the bag.

20 Claims, 2 Drawing Sheets

GRASS-BAGGING APPARATUS

BACKGROUND OF THE INVENTION

1. Field of the Invention

This invention relates to apparatus for bagging grass clippings and other cuttings, and more particularly, to an apparatus which directs the clippings and cuttings into a disposable bag.

2. Description of the Prior Art

Baggers for catching grass clippings and other cuttings and which are attached to lawn mowers are, of course, well known. Typically, for a power lawn mower, the grass bagger is attached by a connecting mechanism to a discharge opening on the lawn mower. The cuttings are then directed into a bag which must be emptied when full. That is, in most prior art baggers, the bag is a specifically designed bag for use with the mower and is not disposable.

Some devices have been developed which use disposable bags. For example, U.S. Pat. No. 3,133,396 to Leader discloses an apparatus which has a bag supporting member which is attached to a mower discharge outlet and a bag which is attached to an upstanding, supporting member which retains the mouth of the bag in an open position. The bag is externally supported by the bag supporting member, and the bag may be of a disposable plastic type.

Another device which uses a disposable trash bag liner and has a disposable bag for catching grass clippings is shown in U.S. Pat. No. 4,251,982 to Skaja et al.

These and other prior art baggers provide external support for the bag but unfastening the bag from the mower may present problems such as spillage of grass cuttings. Also, with the prior art baggers, the bag must be lifted from the support apparatus for disposal.

The apparatus of the present invention solves these problems by providing an internal support for the bag which supports the bag as it is removed from the mower. The internal support also directs the grass cuttings into the bag and may be quickly and easily removed from the bag after it is detached from the mower, thereby minimizing spillage. Because the internal support is removed from the bag, rather than the bag being removed from the support as with prior art devices, the lifting of the bag is minimized. A full bag of grass can be quite heavy, particularly if the grass is wet, and the present invention reduces the exertion required by the operator.

SUMMARY OF THE INVENTION

The apparatus of the present invention is an apparatus used for catching and bagging grass and other clippings discharged from a lawn mower. The grass-catching apparatus comprises a bag attached to the discharge of a mower and chute means disposed in the bag for internally supporting the bag and for directing grass cuttings into the bag. A fastening means is provided for fastening the chute means to the lawn mower and for retaining an open end of the bag.

The chute means defines an open end so that it may be withdrawn from the bag, leaving the grass cuttings in the bag.

Stated in another way, the grass-catching apparatus of the present invention comprises a chute having opposite open ends, fastening means for fastening the chute to a lawn mower, and a disposable bag with an open end disposed around the chute and retained by the fastening means. Preferably, the chute tapers from one of the open ends to the other and defines a plurality of openings in a wall thereof. The bag may be made of a disposable plastic material and preferably defines a plurality of perforations therein.

The present invention may also be described as a mowing apparatus comprising a lawn mower having a discharge opening in a housing thereof, a chute having a first open end adapted for positioning adjacent to the discharge opening on the mower and a second end opposite the first end, a flexible bag disposed around the chute and having an open end adjacent to the first open end of the chute, and fastening means for fastening the chute and the bag to the lawn mower adjacent to the discharge opening. Preferably, the second end of the chute is also an open end such that the chute may be removed from the bag leaving grass cuttings therein.

A screen may be disposed between the second end of the chute and an operator of the mower. The screen is preferably adapted for hanging from a handle of the mower and is made of a metal mesh material. The screen acts as a protecting means for protecting the operator from objects, such as rocks, which might be discharged from the mower and perforate the thin material of the bag.

Numerous objects and advantages of the invention will become apparent as the following detailed description of the preferred embodiment is read in conjunction with the drawings which illustrate such embodiment.

DESCRIPTION OF THE PREFERRED EMBODIMENT

Figure 1:
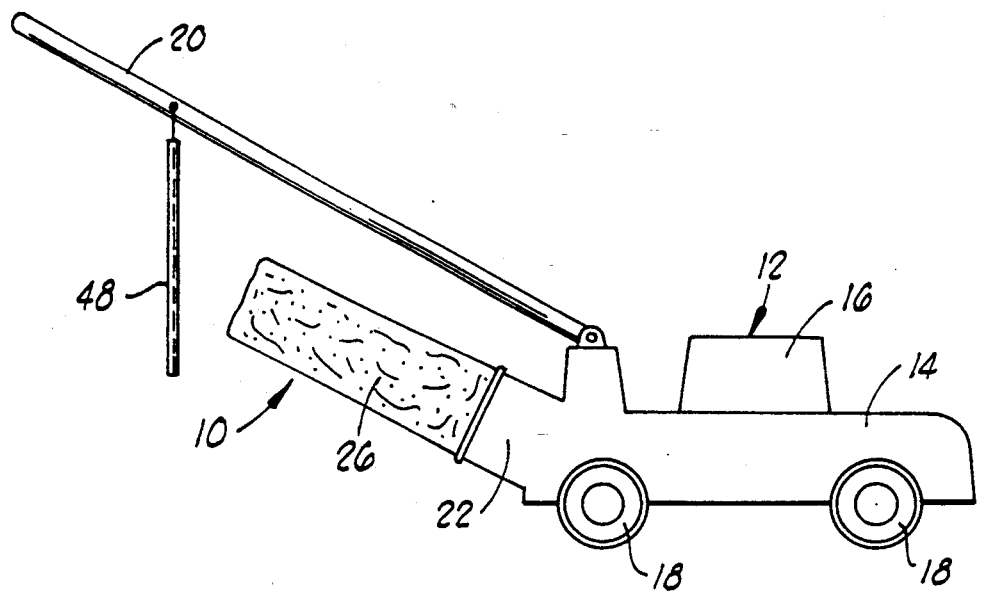
FIG. 1 is a side elevational view of the grass-bagging apparatus of the present invention in an operating position attached to a lawn mower.
Figure 2:
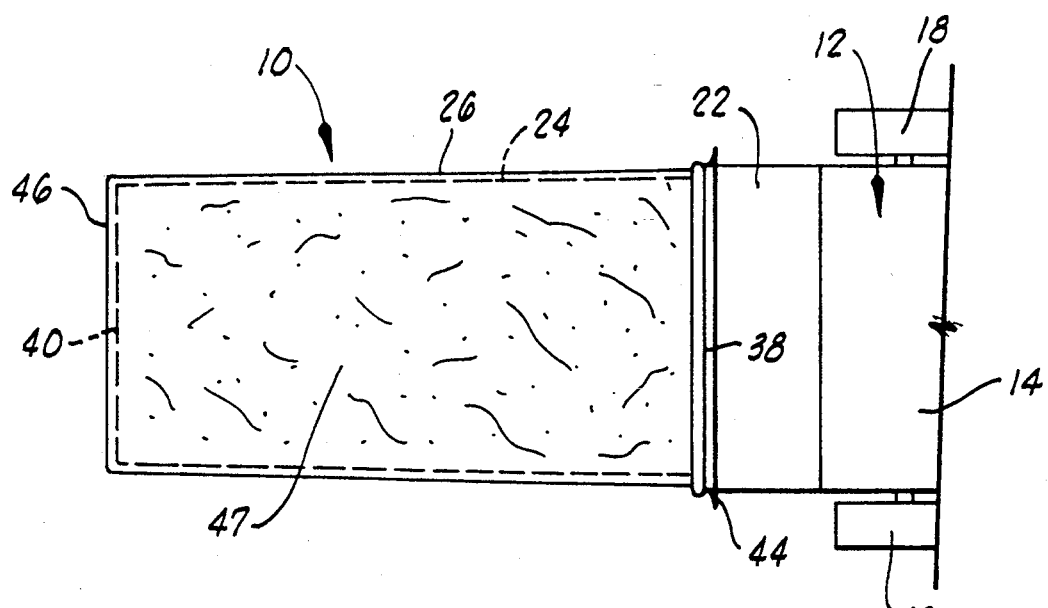
FIG. 2 shows a plan view of the grass bagger attached to the lawn mower.

Referring now to the drawings, and more particularly to FIGS. 1 and 2, the grass-bagging apparatus of the present invention is shown and generally designated by the numeral 10. Apparatus 10 is connected to a typical lawn mower 12 of the kind known in the art.

The illustrated embodiment of lawn mower 12 has a housing 14 in which a rotary blade is driven by an internal combustion engine 16. A plurality of wheels 18 support lawn mower 12 as it is moved along a ground surface. Lawn mower 12 is controlled and pushed in a normal manner by a rearwardly extending handle 20.

In the illustrated embodiment, housing 14 has a rearwardly facing discharge portion to which apparatus 10 is attached, although side discharge mowers could also be used.

Figure 3:
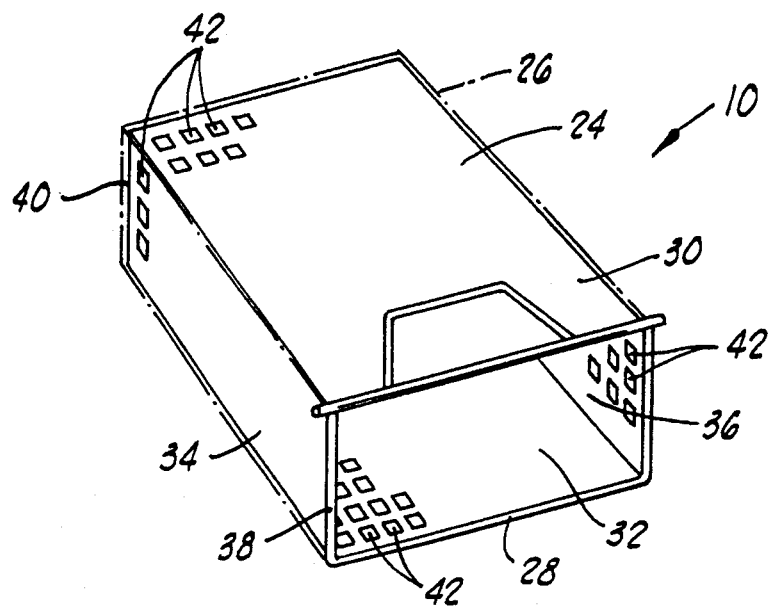
FIG. 3 is a perspective view of the grass bagger.
Figure 4:
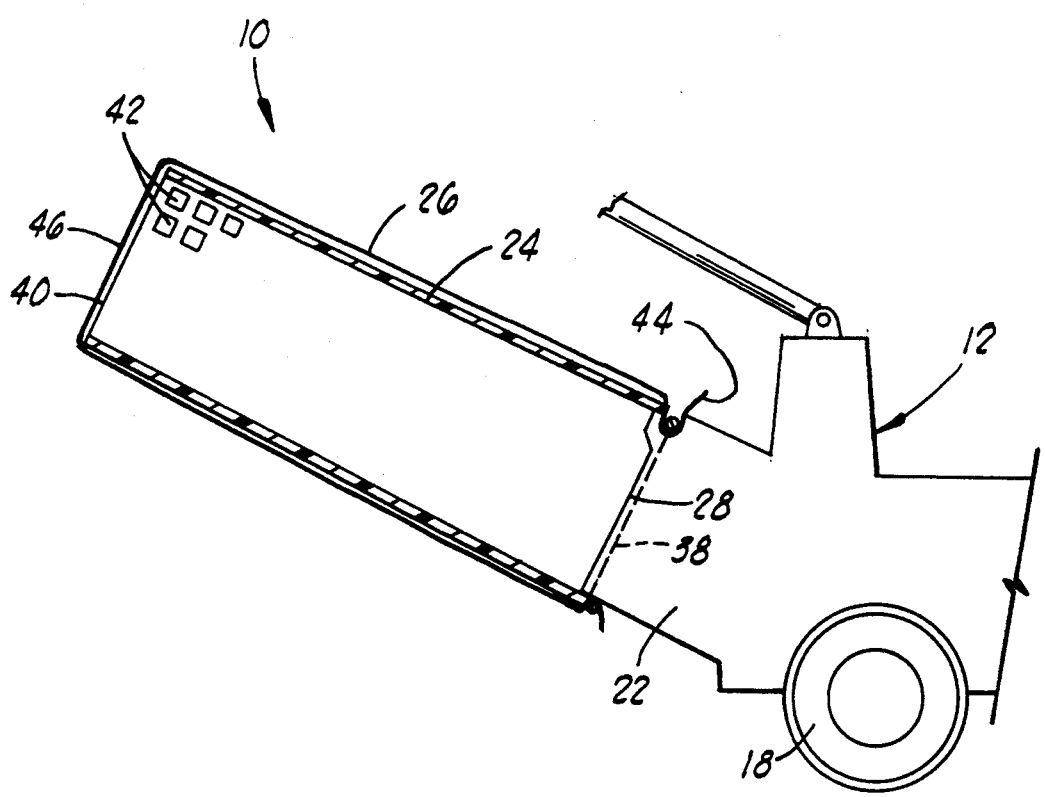
FIG. 4 is a vertical cross section illustrating how the grass bagger apparatus is attached to a lawn mower.

Referring now to FIGS. 3 and 4, the details of grass-bagging apparatus 10 will be discussed. Generally, grass-bagging apparatus 10 comprises a tunnel or chute 24 around which a flexible bag 26 is disposed, and a mounting frame or fastening means 28 which is used to attach chute 24 and bag 26 to lawn mower 12.

Chute 24 is formed by an upper wall 30, an opposite lower wall 32, and a pair of opposed side walls 34 and 36. Thus, chute 24 has a generally rectilinear cross-sectional shape. Chute 24 has a pair of opposite first and second open ends 38 and 40. Preferably, but not by way of limitation, chute 24 tapers inwardly from first open end 38 to second open end 40. That is, the cross-sectional area of first open end 38 is somewhat larger than second open end 40.

Each of walls 30, 32, 34 and 36 of chute 24 preferably define a plurality of openings 42 therethrough so that air can freely pass through the openings.

Preferably, bag 26 is made of a flexible, plastic material and is disposable. Bag 26 may be described in one embodiment as a standard garbage bag, but the invention is not intended to be limited to any particular prior art bag. Bag 26 may also include a plurality of perforations 47 therein which allow the escape of air as further described herein.

In operation, bag 26 is disposed around chute 24 such that an open end 44 of the bag is generally positioned adjacent to first open end 38 of chute 24. Bag 26 has only one opening 44, and thus a closed end of bag 46 covers second open end 40 of chute 24.

Mounting frame 28 is of a kind similar to that used in the prior art to attach a non-disposable bag to lawn mower 12. In the preferred embodiment, mounting frame 28 is made of metal rod and fits onto discharge portion 22 of the lawn mower in a manner known in the art. Mounting frame 28 is attached to chute 24 adjacent to first open end 38 thereof. Open end 44 of the bag may be clamped to the lawn mower when mounting frame 28 is attached to the mower. Thus, while apparatus 10 is new, the method of mounting thereof to lawn mower 12 is substantially the same as the prior art.

As mower 12 is used, the grass cuttings and clippings are discharged therefrom through discharge portion 22. It will thus be seen by those skilled in the art that such cuttings and clippings pass through open end 44 of bag 26 and first open end 38 of chute 24. Basically, chute 24 serves to direct the cuttings into bag 26 and to support the bag internally during a mowing operation.

With some lawn mowers, a great amount of air is moved along with the grass cuttings, and such air tends to internally pressurize apparatus 10. Openings 42 in chute 24 relieve such pressure allowing the air to escape the chute, thereby facilitating filling of the chute with grass cuttings and clippings. Openings 42 are generally large enough to allow air to pass through without allowing any substantial amount of grass cuttings to escape the chute, although a small amount of grass passing through openings 42 causes no problems.

In order to keep bag 26 from inflating or being ruptured by the air pressure, perforations 47 allow air to escape from bag 26 but do not allow grass cuttings to pass therethrough.

After apparatus 10 is filled with grass, it may be detached from lawn mower 12 in a reverse of the attachment process. Bag 26 with chute 24 therein, the assembly of the two being filled with grass, may be positioned on the ground so that first open end 38 of chute 24 and open end 44 of bag 26 are generally facing upwardly. Chute 24 may be then grasped by the operator and raised upwardly out of bag 26 leaving the grass clippings therein. This is facilitated by the tapered shape of chute 24. Bag 26 with the grass cuttings therein may then be closed by any manner known in the art and discarded. It will be seen that the amount of lifting of bag 26 is minimized. That is, unlike prior art baggers which use disposable bags, it is not necessary to lift the bag away from any support apparatus. It is only necessary to remove the bag from the mower, after which chute 24 is removed from the bag.

Chute 24 may be then refitted with another bag 26 and the entire operation repeated. Thus, it is not necessary to ever empty bag 26, unlike most prior art apparatus which have a reusable custom-made bag which comes with the lawn mower apparatus. That is, with the present invention, it is not necessary to lift the heavy, filled bag and dump the grass cuttings therefrom. With custom-made bags, the bag must be lifted and shaken so that the cuttings are removed for disposal. The present invention eliminates this, thereby minimizing the exertion required by the user. For example, the minimal handling of the filled bag is much easier on the back because there is much less lifting required.

Referring again to FIG. 1, the grass-bagging apparatus of the present invention may further comprise a screen 48 adapted for hanging from handle 20. Screen 48 is designed to be positioned between second open end 40 of chute 24 and the operator of mower 12. With chute 24 having second open end 40, objects, such as rocks or other debris, may be thrown rearwardly from the mower. Such high velocity solid objects may perforate the relatively thin material of closed end 46 of bag 26, causing possible injury to the operator of mower 12. Screen 48 prevents such objects from reaching the operator, and preferably, is made of a metal mesh material which is not easily perforated.

It will be seen, therefore, that the grass-bagging apparatus of the present invention is well adapted to carry out the ends and advantages mentioned as well as those inherent therein. While a presently preferred embodiment of the apparatus has been shown for the purposes of this disclosure, numerous changes in the arrangement and construction of parts may be made by those skilled in the art. All such changes are encompassed within the scope and spirit of the appended claims.

What is claimed is:

1. A grass-catching apparatus comprising:
   a chute having opposite open ends, one of said open ends being adapted for positioning adjacent to a discharge portion of a lawn mower;
   fastening means for fastening said chute to said lawn mower; and
   a disposable bag with an open end disposed around said chute such that said bag is internally supported by said chute, said bag being retained by said fastening means.

2. The apparatus of claim 1 wherein said chute is tapered from one of said open ends to the other.

3. The apparatus of claim 1 wherein said chute defines a plurality of openings in a wall thereof.

4. The apparatus of claim 1 wherein said bag defines a plurality of perforations therein.

5. The apparatus of claim 1 wherein said bag is made of a flexible plastic material.

6. A mowing apparatus comprising:
   a lawn mower having a discharge opening in a housing thereof;
   a chute having a first open end adapted for positioning adjacent to said discharge opening on said mower and a second end opposite said first end;
   a flexible bag disposed around said chute and having an open end adjacent to said first open end of said chute such that said chute internally supports said bag; and fastening means for fastening said chute and said bag to said lawn mower adjacent to said discharge opening.

7. The apparatus of claim 6 wherein said second end of said chute is an open end.

8. The apparatus of claim 6 wherein said chute is tapered from said first end to said second end.

9. The apparatus of claim 6 wherein said chute defines a plurality of vent openings therethrough.

10. The apparatus of claim 6 wherein said bag defines a plurality of vent openings therein.

11. The apparatus of claim 6 further comprising a screen disposed between said second end of said chute and an operator of said mower.

12. The apparatus of claim 11 wherein said screen is adapted for hanging from a handle of said mower.

13. The apparatus of claim 11 wherein said screen is made of a metal mesh material.

14. The apparatus of claim 6 wherein said bag is made of a flexible plastic material.

15. The apparatus of claim 6 wherein said chute is molded of a plastic material.

16. A grass-catching apparatus comprising:
a bag attached to an end of a mower; and
chute means disposed in said bag for internally supporting said bag and for directing grass cuttings therein.

17. The apparatus of claim 16 wherein said chute means has an open end so that said chute means may be withdrawn upwardly from said bag, thereby leaving said cuttings in said bag.

18. The apparatus of claim 17 wherein said chute means tapers toward said open end.

19. The apparatus of claim 17 wherein said chute means defines a plurality of openings in a wall thereof.

20. The apparatus of claim 16 wherein said bag defines a plurality of vent perforations therein.

* * * * *

UNITED STATES PATENT AND TRADEMARK OFFICE
CERTIFICATE OF CORRECTION

PATENT NO. : 5,365,727

DATED : November 22, 1994

INVENTOR(S) : Donald R. Cross

It is certified that error appears in the above-identified patent and that said Letters Patent is hereby corrected as shown below:

Column 2, line 64, after the period, insert the following:

--Chute 24 is preferably made of plastic, although the invention is not intended to be limited to any particular material.--.

Column 4, lines 1-5
Claim 1 should read as follows:
A grass-catching apparatus comprising:
a chute having opposite open ends, one of said open ends being adapted for positioning adjacent to a discharge portion of a lawn mower;
fastening means for fastening said chute to said discharge portion of said lawn mower; and
a disposable bag with an open end disposed around said chute such that said bag is internally supported substantially along its entire length by said chute, said bag being retained by said fastening means.

Column 4, lines 19-28
Claim 6 should read as follows:
A mowing apparatus comprising:
a lawn mower having a discharge opening in a housing thereof;
a chute having a first open end adapted for positioning adjacent to said discharge opening on said mower and a second end opposite said first end;
a flexible bag disposed around said chute and having an open end adjacent to said first open end of said chute such that said chute internally supports said bag substantially along its entire length; and
fastening means for fastening said chute and said bag to said lawn mower adjacent to said discharge opening on said mower.

UNITED STATES PATENT AND TRADEMARK OFFICE
CERTIFICATE OF CORRECTION

PATENT NO. : 5,365,727
DATED : November 22, 1994
INVENTOR(S) : Donald R. Cross

It is certified that error appears in the above-identified patent and that said Letters Patent is hereby corrected as shown below:

Column 6, lines 5-9

Claim 16 should read as follows:
A grass-catching apparatus comprising:
a bag attached to a discharge end of a mower; and
chute means disposed in said bag for internally supporting said bag substantially along its entire length and for directing grass cuttings therein.

Signed and Sealed this

Twenty-first Day of February, 1995

Attest:

BRUCE LEHMAN

Attesting Officer     Commissioner of Patents and Trademarks